United States Patent
Bridgelall et al.

[19]

[11] Patent Number: 5,889,269
[45] Date of Patent: Mar. 30, 1999

[54] LINEARIZATION OF RASTER PATTERNS IN 2D OPTICAL SCANNERS

[75] Inventors: Raj Bridgelall, Mount Sinai; Duanfeng He, Farmingville; Eugene Joseph, Port Jefferson; William John Sakoda, East Setauket, all of N.Y.

[73] Assignee: Symbol Technologies, Inc., Holtsville, N.Y.

[21] Appl. No.: 789,660

[22] Filed: Jan. 27, 1997

[51] Int. Cl.[6] .................................................. G06K 7/10
[52] U.S. Cl. ........................... 235/462; 235/454; 235/470
[58] Field of Search .................................. 235/462, 454, 235/456, 467, 470, 472, 463, 466

[56] References Cited

U.S. PATENT DOCUMENTS

| | | | |
|---|---|---|---|
| 4,360,798 | 11/1982 | Swartz et al. ............................ | 235/463 |
| 4,402,088 | 8/1983 | McWaters et al. .................. | 235/454 X |
| 5,168,149 | 12/1992 | Dvorkis et al. ...................... | 235/462 X |
| 5,235,167 | 8/1993 | Dvorkis et al. ...................... | 235/472 X |
| 5,241,164 | 8/1993 | Pavlidis et al. ...................... | 235/466 X |
| 5,278,398 | 1/1994 | Pavlidis et al. .......................... | 235/462 |
| 5,369,264 | 11/1994 | Rosa et al. .............................. | 235/462 |
| 5,478,997 | 12/1995 | Bridgelall et al. ...................... | 235/462 |
| 5,504,316 | 4/1996 | Bridgelall et al. .................. | 235/470 X |
| 5,525,788 | 6/1996 | Bridgelall et al. .................. | 235/470 X |
| 5,569,901 | 10/1996 | Bridgelall et al. ...................... | 235/470 |
| 5,608,202 | 3/1997 | Bridgelall et al. ...................... | 235/462 |
| 5,637,856 | 6/1997 | Bridgelall et al. .................. | 235/462 X |
| 5,705,799 | 1/1998 | Li ...................................... | 235/467 X |

FOREIGN PATENT DOCUMENTS 0-384-955-A2  9/1990  European Pat. Off. .

*Primary Examiner*—Michael G. Lee
*Attorney, Agent, or Firm*—Kirschstlen, et al.

[57] ABSTRACT

An optical scanner for reading two-dimensional indicia such as bar code symbols and the like includes a scan element arranged to create a two-dimensional raster pattern which may be scanned across the indicia to be read. In order to improve linearity of response in the vertical direction, perpendicular to the direction of the scan lines, the scan element is driven in that direction by a modified triangle waveform in which the amplitude and/or the phase of at least one of the harmonics has been altered. A scanning synchronization signal is provided by a long thin photodetector which is swept by the scanning beam at the left hand end of each scan path. This enables reading of vertically-modulated bar code symbologies such as POSTNET and PostBar.

25 Claims, 5 Drawing Sheets

LINEARIZATION OF RASTER PATTERNS IN 2D OPTICAL SCANNERS

BACKGROUND OF THE INVENTION

1. Field of the Invention

The invention relates generally to optical scanners having an improved linearized raster scanning pattern for two-dimensional imaging. It relates particularly, though not exclusively, to scanners for reading bar code symbols having vertically-modulated symbologies such as POSTNET or PostBar.

2. Description of Related Art

Conventional optical scanners such as bar code readers normally operate by scanning a laser beam across a bar code symbol or optical indicia to be read. Light reflected from the symbol or indicia is detected, digitized and decoded to extract the information represented by the symbol or indicia. Frequently, the symbol or indicia is one-dimensional and is scanned merely by oscillating a fixed laser beam back and forth to form a scan line. Recently, however, there has been increased interest in two-dimensional symbols or indicia, not least because of the greater information content that they can carry.

Imaging in two dimensions is somewhat more complex than imaging in one dimension. One possible approach for two-dimensional imaging is to make use of two-dimensional arrays of charge coupled devices (CCDs) or photodiode arrays, for example as is disclosed in U.S. Pat. No. 4,408,334. Neither has become particularly popular in practice, however, primarily because of the cost. Two-dimensional arrays are relatively difficult and expensive to manufacture, and, as in any semi-conductor technology, many dies are produced having defects which prevent them from imaging over their entire surface. Such defective arrays are frequently not usable in high resolution imaging applications.

An alternative approach to two-dimensional imaging is to use a scanner, for example a laser scanner, which scans the beam in a two-dimensional raster pattern across the symbol or indicia to be read. Problems have been encountered in practice, however, in that it is difficult to capture a two-dimensional image using this particular technology without substantial distortions. Distortions tend to be particularly severe in the vertical or y direction, that is in the direction which is perpendicular to the individual scan lines. The distortions are due to the nonlinear response of the scanning element. These have proved in practice difficult to eliminate.

A standard raster pattern is normally generated using sinusoidal signals both on the horizontal (x) and vertical (y) axes. However, the image captured with such a pattern will not have a uniform resolution along the y-axis. The scan lines tend to bunch together at the top and bottom of each frame, thereby wasting scan lines at the edges and producing rather sparse coverage in the center of the frame. It might be thought that the obvious solution to linearizing the y axis would be to replace the sinusoidal with a linear (triangular) y-axis drive signal. However, the applicants have found that when the scan element is driven with such a triangular waveform the distortions tend to become even worse. The reason is that a triangular waveform has many harmonics that interact with the many resonant modes of the scan element (oscillating mirror) thereby producing unpredictable and somewhat erratic behavior.

As the image becomes distorted, the following problems arise:

1. Decreased working range. This arises because as the required working distance increases, the diverging y-axis scan amplitude further separates the already sparse areas of scan line distribution in the center of the frame. If the working distance is too high, the scan lines in the center of the frame may be too widely spaced to allow effective image capture.
2. Difficulty in aiming the scanning pattern at the indicia to be decoded. If the scanning pattern is not uniform across the frame, the user tends to find in practice that the indicia has to be located at the densest part of the scan pattern in order to ensure an easy decode. If the scan line distribution were to be uniform within the scanning frame, this problem would not arise as the indicia could be decoded with the same ease anywhere within that frame.
3. There is less tolerance to tilting the indicia, since the uneven y-axis resolution tends to warp the image.
4. There is less reading robustness since geometric shapes become severely distorted.

Certain bar code symbologies encode data by means of the relative heights of bars on an essentially one-dimensional pattern. An example of such a symbology is the Postal Numeric Encoding Technique (POSTNET) developed by the US postal service to provide an optimized bar code system for encoding address information on letter mail. The basic elements of a POSTNET code, shown in FIG. 3, are tall bars 110 and short bars 112, representing respectively binary ones and zeros. Both the tall bars and the short bars are horizontally aligned along the bottom edge of the symbol. Five bars of code represents one character. One method of decoding symbologies of this type is disclosed in U.S. Pat. No. 5,369,264 which uses a one-dimensional scanner having an elongate scanning area which extends in the direction parallel to the bars of the symbol.

It is an object of the invention to provide a two-dimensional optical scanner having improved linearity, particularly in the vertical or y direction.

SUMMARY OF THE INVENTION

According to a first aspect of the invention there is provided an optical scanner for reading indicia having regions of differing light reflectivity, the scanner comprising:

(a) a light source for producing a light beam;

(b) a scanner driver for producing first and second electrical drive signals;

(c) a scanning element for scanning the light beam in a raster pattern comprising a plurality of generally parallel scan lines across an indicium to be read, the scanning element controlling the scanning beam in a direction parallel to the scan lines in dependence upon the first drive signal and in a direction perpendicular to the scan lines in dependence upon the second drive signal; and wherein the second drive signal is a modified triangular waveform.

Such a scanner provides a vertical beam motion which is of greater linearity than would be the case with conventional sinusoidal or triangular wave drive signals.

According to a second aspect there is provided a method of controlling an optical scanner for reading indicia having areas of differing light reflectivity, the scanner having a light source for producing a light beam and a scanning element for scanning the light beam in a raster pattern comprising a plurality of generally parallel scan lines across an indicium to be read, the method comprising driving the scanning element in a direction perpendicular to the scan lines by a modified triangular waveform drive signal.

The scanner may be arranged to detect any suitable two-dimensional indicia such as, for example, a signature, a POSTNET code (FIG. 3), or a PDF 417 code. The scanner may also be arranged to read other bar code symbologies such as PostBar, Planet, Code 39, Code 93, Code 128, Code 2 of 5, UPC, RM4SCC (FIG. 4) and Canada Post (FIG. 5) codes.

Where the scanner is to be used to read a height modulated bar code, having some bars of lesser height and some bars of greater height (such as that shown in FIGS. 3 to 5), the substantially evenly spaced scan lines in the vertical direction allows for easy recognition of which bars are long and which bars are short. As shown in FIG. 3, some scan lines 114,116 will cut only the long bars, and some 118, 120 will cut both the long and the short bars.

Following raster synchronization, the raw data may be converted into DBP "Digital Bar Pattern" format. This is a sequence of integers, with alternate integers in the sequence representing the widths of consecutive bars and spaces within the barcode symbol to be read. Thus, the first, third, fifth and so on integers represent the widths of the first, second and third bars. The second, fourth, sixth and so on integers represent the width of the first, second and third spaces.

The present invention preferably includes a number of individual software features, which are briefly mentioned below along with their associated advantages:

1. Usually image processing software requires a lot of memory. We achieve our goal without increasing the RAM hardware requirement. This is achieved by processing the DBP data as they come in and constructing an image-understanding model based on our expected target. The expected target is a series of vertical bars with different heights but the same width. The image understanding model is the Line Adjacency Graph (LAG). We use a simplified LAG structure which uses very limited RAM. No image needs to be created in memory. (This feature is suitable also for scanners with a linear CCE as input device).
2. Usually image processing software requires a lot of processing time or CPU power. The LAG structure we use is easy to compute, thus can be calculated as data comes in. In addition, we split the image processing into two parts: per-line processing and per-frame processing. Per-line processing builds the image understanding model, which mainly consists of x-synchronization, noise removal and LAG construction. Per-frame processing attempts to decode the result from the LAG structure.
3. In our approach, we provide an x-synchronization through the use of a hardware "guard-bar", and a y-synchronization through the use of a pair of clocks: the master clock and slave clock. The use of two clocks ensures that when we lose count because of processing falling behind the data gathering, we can re-synchronize at the start of the next frame.
4. We achieve auto-discrimination between postal codes, PDF and linear codes by separating data frames into PostBar-frames and non-PostBar-frames. During a PostBar-frame, the Postbar per-line processing is invoked. During a non-PostBar-frame, the PostBar per-frame processing is done first on the LAG built during the previous PostBar-frame, and then the decoder time is given back to the regular linear and PDF decoders. Whichever code decoded first ends the decode session.
5. A PostBar symbol requires relatively dense scan line y-coverage, while a PDF symbol requires a sufficient height in y-coverage. To allow both to be decoded by the same scanner, we use a mode-switching mechanism. The scanner starts off in a "PostBar" mode, in which a "slab scan pattern" with dense y-pattern is created. In this mode, both PostBar symbols and linear symbols can be decoded with ease. Although during this time a PDF code could be found, it may not be decoded if it has a height larger than that of the slab. Once the PDF label is found, the scanner brakes the y-scan first (allowing further gathering of data in this mode), then switches to a large y-raster. This allows a PDF label with large y-size to be covered by the scan pattern.
6. The scanner may, in practice, have a different x-speed profile for the forward and for the reverse scans. To make use of both of these, we create separate data structures for them and process them separately until the LAGs are completed. If neither one can be decoded alone, we attempt to merge the LAGs from forward and reverse scan lines. This merged LAG has a higher y-resolution than the resolution of either forward or reverse scans alone.
7. Once the trigger is pulled, the scanner tries to decode the PostBar pattern up to 18 times per second. This feature greatly increases the chance of decode. (This logic can also be used with scanners using a 2-D CCD as input device).
8. Some data in the PostBar symbology are not protected by any means. To reduce the error rate, we compare two subsequent decoding results of the unprotected data and only report a successful decode when the two are identical.
9. Many parameters are used to define the PostBar's size and features. These parameters are adapted when data are being processed and features found. We use a class of digital adaptive filters with the general formula $y+(x-y)/m$, where x is the input value, y is the parameter which is to be adapted towards x, and m is the "length" of the filter. Usually, $m=2^n$, where n is an integer, so the division can be done in an efficient right shift operation. This type of filters are similar to the average filter over the last m input values, but is much easier to compute and costs less memory space.

BRIEF DESCRIPTION OF THE DRAWINGS

The invention may be carried into practice in a number of ways and one specific embodiment will now be described, by way of example, with reference to the accompanying wings in which.

DETAILED DESCRIPTION OF THE PREFERRED EMBODIMENT

Figure 1:
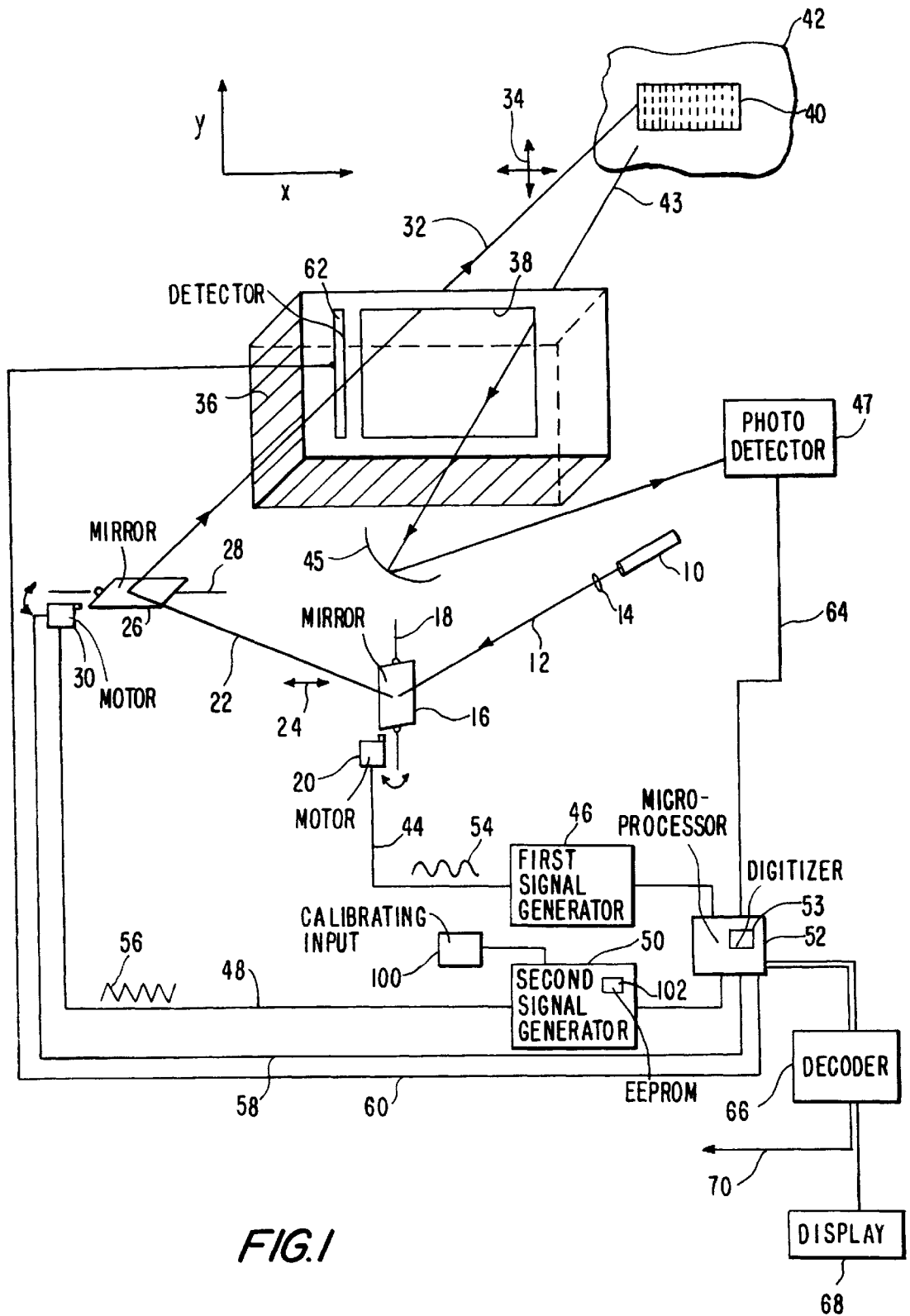
FIG. 1 illustrates schematically an optical scanner according to a preferred embodiment of the invention.

In the preferred optical scanner, shown in FIG. 1, a laser 10 produces a beam 12 which is conditioned by optical elements 14 before impinging upon a first scanning mirror 16 which is arranged to oscillate about a vertical axis 18 by means of a first motor 20. The oscillation of the mirror 16 causes the reflected beam 22 to scan back and forth in the x direction as is indicated by the arrows 24. The scanning beam 22 then impinges upon a second scanning mirror 26, this mirror being arranged to oscillate about a horizontal axis 28 by means of a second motor 30. It will be understood that the combined oscillation of the mirrors 16,26 creates a reflected beam 32 which scans in both the x and y directions, as indicated by the arrows 34. The mirrors 16,26 may be mounted for oscillation in any convenient manner. An exemplary arrangement of mirrors and motors is disclosed in our co-pending U.S. application Ser. No. 08/435,470 filed May 5, 1995, the teachings of which are incorporated herein by reference.

The beam 32 leaves a housing of the scanner, indicated schematically at 36 via a window 38. The beam then impinges upon a two-dimensional bar code symbol or other indicia 40 which has been printed onto or otherwise secured to a substrate 42. The indicia 40 may be any type of image that has to be captured by the scanner, for example a bar code such as that illustrated in FIG. 3. It will be appreciated that a whole range of indicia may be captured, from one-dimensional bar code symbols to one-dimensional symbols which are height encoded (for example POSTNET or other similar symbologies such as the Canadian PostBar symbologies) to fully two-dimensional symbologies (for example PDF 417). Other types of two-dimensional image, such as signatures, may also be captured.

Light 43 which has been reflected from the indicia 40 passes back through the window 38 and impinges upon a collecting mirror 45 which focuses it onto a photodetector 47.

By suitable control of the amplitude and relative phase of the oscillations of the mirrors 16,26, the beam 32 may be made to trace out an appropriate desired pattern in two-dimensions across the indicia 40. Typically, the desired pattern will be a raster scan pattern, comprising a series of generally parallel horizontal (x-axis) scan lines which are defined by the first mirror 16 spaced along the vertical (y-axis) by an amount which is defined by oscillation of the second mirror 26.

Control of the first mirror 16 is achieved by driving the first motor 20 in a predetermined pattern according to signals received along a first signal line 44. These signals are generated by a first signal generator 46. Likewise, control of the second mirror 26 is achieved by driving the second motor 30 according to signals provided on a second signal line 48. The signals are provided by a second signal generator 50. Both signal generators are operated under the overall control of a microprocessor unit 52 including a digitizer 53.

The signal provided to the first motor 20 may be any convenient driving signal, such as for example a sinusoidal signal 54. However, to achieve linearization of the raster scan in the y direction, the signal provided to the second motor 30 has to be carefully controlled. As is indicated at numeral 56, the signal is a modified triangular waveform which will be discussed in more detail below. Providing a sinusoidal driving signal in the x direction provides a sufficiently linear response since typically only the central part of the sinusoidal curve falls within the window 38. The end portions of the sinusoidal curve, where the beam reverses direction, are of course extremely non-linear but that does not normally matter since those portions are generally clipped by the sides of the housing 36. The clipping of the end portions of the curves by the housing is not easily achievable for the vertical scan direction at the preferred frequencies: hence the need exists for more complex means of achieving linearization in the y direction.

The position of the mirror 26 and/or the motor 30 is supplied to the microprocessor 52 by means of a feed-back line 58. Also provided to the microprocessor along a line 60 is a timing signal derived from a long narrow photodiode 62 attached to the left-hand side of the window 38. The oscillation of the first mirror 16 is such as to cause the beam 32 to cross the diode 62 after every left/right double scan. This generates a synchronization signal which is received by the microprocessor unit 52 at the beginning of every forward scan and at the end of every reverse scan. This signal may be used by the microprocessor unit to enable the scans to be aligned properly in the horizontal direction and so reconstructed as an image. Finally, the microprocessor receives along a line 64 signals representative of reflected light detected by the photodiode 47. The working range of the scanner is typically 20 to 33 cm (about 8 to 13 inches).

The information received by the microprocessor unit 52, as digitized by the digitizer 53, is passed to a decoder 66 which decodes the information (for example numbers or text) represented by the bar code symbol or indicia 40. The decoded information may then be passed on for further processing along a line 70, or may simply be displayed on an appropriate display 68. The decoder 66 will normally be embodied by a suitably programmed microprocessor, the algorithms for which will of course vary according to the symbology to be decoded. The decoder 66 receives a pulse width modulated digital signal from the digitizer 53, and a software algorithm then attempts to decode the scanned indicia 40. If the START and STOP characters and the characters between them in the scan were decoded successfully and completely, the decoding process terminates and an appropriate indication may be provided to the user on the display 68. Otherwise, the decoder receives the next scan, performs another decode attempt on that scan, and so on, until a completely decoded scan is achieved or no more scans are available. Such a signal is then decoded according to the specific symbology into a binary representation of the data encoded in the symbol 40, and to the alphanumeric characters so represented in a typical PostBar decoder, raster synchronization, noise removal and bar correlation will be sequentially undertaken for each of the bars. Once all the bars have been decoded, image interpretation and decoding is carried out on the overall image. This comprises PostBar segmentation, low-level bar classification followed by high-level decoding. The output is the information encoded in the indicia 40.

Only suitable digitizer 53 may be used, for example the type disclosed in our U.S. Pat. No. 4,360,798, incorporated herein by reference. It will be understood that where the indicia is merely to be captured as an image, no decoder may be necessary.

Before turning to a more detailed consideration of the drive signals 54,56, it will be briefly discussed why there is a greater requirement to linearize the scanning pattern in the y direction than in the x direction. In a typical scan engine, there is generally a very high Q factor or selectivity in the horizontal (x) scanning direction, so that any harmonic distortions from the horizontal drive frequency 54 are effectively filtered out. On the other hand, the fundamental frequency of the vertical drive waveform 56 tends to be located close to the first vertical oscillation mode of the scan element (i.e. the mirror/motor combination). In a typical arrangement, this mode is at about 22 Hz and has a comparatively low Q factor. Because of this low Q resonance mode, the scan element tends to be particularly sensitive to certain harmonics of the drive waveform. The non-uniform transfer function unequally affects the odd harmonics of a triangular waveform in both magnitude and phase. This distortion causes non-linear responses in the y-axis scan.

Figure 2:
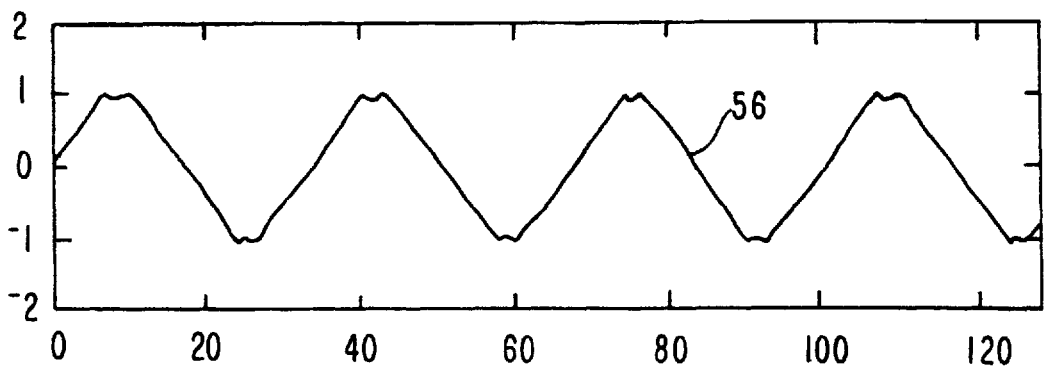
FIG. 2 shows a compensating y-axis drive waveform adapted to provide linearization in the y direction.

In the preferred embodiment, the linearity in the y direction is improved by driving the second motor 30 not with an exact triangular waveform, but rather with a modified waveform 56 best seen in FIG. 2. Although it may not be intuitive, from a visual inspection of the waveform 56, that it will produce a near-linear response from the scanning mirror 26, the present applicants have found that that is indeed the case.

A perfect triangular waveform is composed of odd harmonics that reduce exponentially in magnitude with increasing frequency. The drive waveform 56 is a modified triangular waveform in which the harmonics are distorted in magnitude and phase to compensate for the non-linear distortions introduced by the mounting of the mirror 26, the motor 30 and the filters and other electronics contained within the signal generator 50.

The Fourier expansion of an ideal triangular waveform is given by the following equation:

$$tri(n) = \sum_{k=1}^{J+1} \frac{1}{(2k-1)^2} \cos[(2-1)\Omega_0 nT] \quad (1)$$

Where J is the number of harmonics, T is the sample period, and $w_0$ the fundamental frequency.

The compensating drive waveform 56, tricomp(n), shown in FIG. 2, is given by the following expression:

$$\sum_{k=1}^{J+1} \frac{1}{(2k-1)^2} \left| \frac{1}{H_m(nF_0)} \right| \cos[(2k-1)\omega_0 nT - \text{Phase}[H_m(nF_0)]] \quad (2)$$

Where $H_m(f)$ is the transfer function of the motor/mirror combination and the electronic filters contained within the signal generator 50.

The magnitude of the transfer function $H_m(nF_o)$ can be measured experimentally in degrees by driving the motor 30 with a pure sinusoid at these frequencies, and then normalizing with respect to the fundamental. Accordingly, the fundamental in the compensating waveform given in equation 2 will be multiplied by unity. The experimental values of the transfer function may either be substituted into equation 2 by means of a look-up table, or alternatively the experimental values may be fitted to a typical transfer function equation using conventional multi-dimensional curve fitting techniques. Since it is the low frequency transfer function which is of particular interest, the function may be approximated quite well using the following second order equation:

$$H_m(s) = \frac{A_m s}{s^2 + \frac{\omega_m}{Q_m} s + \omega_m^2} \quad (3)$$

where the constants to be fitted are $A_m$ and $Q_m$. With a typical scan element, $A_m$ may about 8, $Q_m$ about 35, and $w_0$ about 145.0 rad.

It is found in practice that odd harmonics beyond the first two or three do not bring the y-response much closer to the ideal linear response. Accordingly, in practice, the compensating waveform can be adequately represented by modifying just the first three harmonics in an ideal triangular waveform. In the general case, the harmonics will be modified both in amplitude and phase, but once again in practice it may not be necessary to modify both for all of the harmonics.

In a simplified version, only the third harmonic need be modified, as this has the most effect on linearizing vertical response of the scan element. Additional harmonics serve only to increase the sharpness of the turn-around point of the response. Furthermore, since the phase of the third harmonic is relatively insensitive to the scan element's response, it may remain fixed.

The particular drive waveform 56 which is required to linearize the y-axis scan will of course depend upon the precise characteristics of the mirror 26, its mounting and its drive motor 30. If these characteristics are closely controlled during manufacture, the transfer function and hence the resultant drive signal 56 may be the same, or nearly the same, in each manufactured scanner. In that case, the preferred drive signal 56 may be determined in advance, and may be burned into an EEPROM 102 of the signal generator 50.

Alternatively, it may be preferred to make allowance for manufacturing variations, and to calculate the drive signal 56 anew for each individual scanner. In this case, the drive waveform could be calculated as part of the calibration process of an individual scanner. In order to achieve that, the motor 30 would be run at a variety of different sinusoidal frequencies, with the speed of the laser beam 32 in the vertical direction being detected in each case by a low frequency spot speed profiler. An approximation to the transfer function may then be calculated using equation (3) and this may be substituted into equation (2) to determine the ideal compensating waveform for that particular scanner.

In an alternative simplified arrangement, calibration may be undertaken using a triangular drive waveform in which the magnitude of the third harmonic is variable. A calibrating input 100 may then systematically vary this third harmonic amplitude until a satisfactorily linear response is reported by the spot speed profiler.

Many present scan elements exhibit a natural low-frequency oscillation that is quite close to the third and fifth harmonics of the required drive waveform. It is this close proximity which makes the system sensitive to changes in the scan element's natural response. For example, if the low natural frequency of the scan element shifts over time, or with temperature, the vertical scan response will become distorted.

One way of dealing with this, and of improving the method and apparatus already described, is to design the scan element with a low natural frequency that is well away from the third and fifth harmonics of the drive waveform. This can be done, in practice, by designing the scan element with a low natural frequency higher than at least 60 Hz. If all else remains unchanged, this modification would be at the expense of higher power consumption. However, this increase in power consumption can at least partially be offset by increasing the strength of the permanent magnet and increasing the number of windings on the primary coil of the motor 30. Although, as has previously been discussed, high harmonics have little energy so they contribute very little to the response of the scan element, care must nevertheless be taken not to drive the scan element with harmonic contents beyond approximately 145 Hz. The reason for this is that there are typically several other higher frequency modes of the scan element that can have a much higher Q which can severely distort the waveform.

Figure 4:
FIG. 4 shows an exemplary RM4SCC code (Royal Mail Four-State Customer Code) (UK Post Office) suitable for reading by the scanner and method of the present invention.

FIG. 4 shows an alternative symbology that may be read by the device of the present invention. The symbology shown is known as RM4SCC, and has been designed by the UK Post Office. The code is known as a Four-state code, since each vertical line may be one of four types: it may be a short bar 202, a long bar 204, a medium size bar extending upwardly 206, or a medium bar extending downwardly 208. As will be seen, the short bars 202 and the long bars 204 are centered onto a clock track 210, which passes down the middle of the barcode symbol. The upwardly directed bars 206 and the downwardly directed bars 208 extend into the clock track region, so that a scan through the exact center of the symbol may be used to create a clock signal, the bars being spaced equidistantly from each other.

Figure 5:
FIG. 5 shows an exemplary Canada Post code (Lettermail version) suitable for reading by the scanner and method of the present invention.

An alternative symbology that may be read by the device of the present invention is shown in FIG. 5. This is again a Four-state code, known as Canada Post. This exists in various versions and lengths, but all have a rather similar Four-state symbology. The particular version shown in FIG. 5 is the "letter mail" version. It will be seen, once again, that all of the bars extend into a central area 220, which may therefore be used as a clock track.

Figure 3:
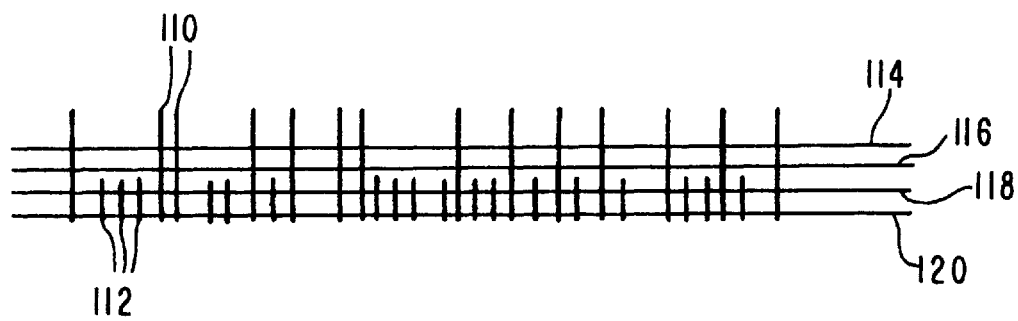
FIG. 3 shows an exemplary POSTNET code suitable for reading by the scanner and method of the present invention.
Figure 6:
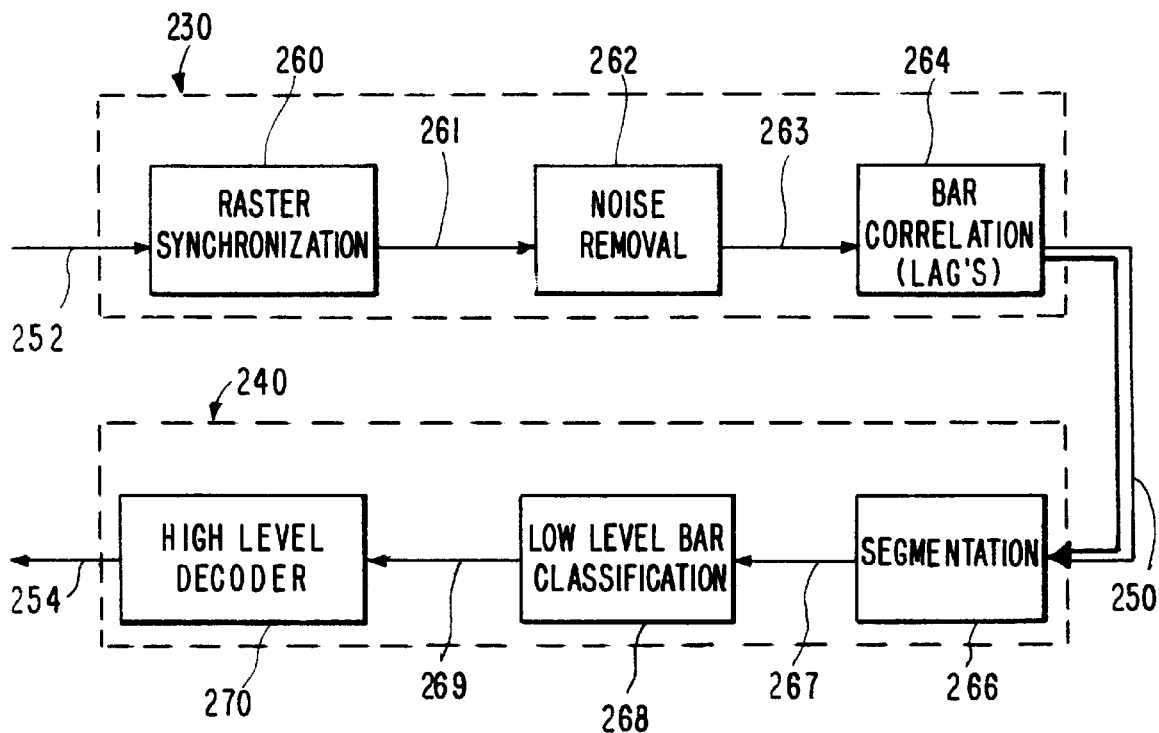
FIG. 6 is a high-level representation of the software architecture.

FIG. 6 illustrates the preferred high-level software architecture that is used to read symbologies of the type shown in FIGS. 3 to 5. The software is organized in two parts, namely the per-line processing section 230 and the per-frame processing section 240. The per-line processing routines 230 handle data as they come in, for example as the symbol is scanned with a first line 114, a second line 116 and so on (FIG. 3). The individual lines are operated on by the routines 230 to produce, as output, a Line-Adjacency-Graph (LAG) data structure. This LAG data structure is then passed on to the per-frame processing routines 240, as schematically indicated by lines 250. The routines 240 interpret the LAG data and attempt to decode the barcode symbol from it.

Image processing applications typically require large memories and powerful processors. These resources are limited, or at least may be limited, in the preferred embodiment. To operate within a small memory space, the algorithms are arranged to run off a Digital Bar Pattern (DBP), rather than image or a bitmap. Each scan line is processed in real time, with only the useful results being stored. To compensate for the limited computing power available, the processor automatically sorts its input by horizontal location. This allows a merge/sort type implementation of the LAG routine, which further speeds up processing.

For further efficiency, the forward and the reverse scan lines are stored and processed separately. The reason that these lines are not combined and dealt with together is that the sync-pattern results from light which is seen by the guard bar 62 (FIG. 1) while the regular DBP comes from light which has been reflected from the barcode symbol. This reflected light is dealt with by a different subsystem (as will be evident from FIG. 1), and will have an unknown phase shift and/or delay in comparison with the information provided by the diode 62. This delay, of course, affects all the forward scans equally, and all the reverse scans equally. However, if one attempts to match the beginning of a forward scan with the end of a reverse scan, the phase shift will be unknown. In the preferred embodiment, the forward and reverse scans are merged at a later stage in the procedure, when a clearer picture of the barcode symbol being scanned has been determined.

We now turn to a more detailed discussion of the power-line routines 230, illustrated in FIG. 6.

Incoming raw data along the line 64 (FIG. 1) is first supplied to a raster synchronization routine 260. In FIG. 6, the incoming raw data is represented by the arrow 252. The raster synchronization routine 260 is responsible for aligning each of the raster lines, so that counting may be commenced from a defined point. This may be done in association with the diode 62 (FIG. 1). The routine is also responsible for determining the direction of the current scan, and setting a variable accordingly. If the sync pattern, from the diode 62, occurs at the beginning of the scan it is a forward scan, otherwise it is a reverse scan. The search for a sync-pattern occurs only within a small window at the beginning and at the end of each scan. The routine also determines the beginning and the end of the data for each individual line. This is always defined from left to right on the target plane; if necessary, the sequence may be reversed in memory.

The output 261 from the raster synchronization routine comprises an aligned set of data representative of a single scan line, or in other words an aligned DBP. This is then passed to a noise removal routine 262.

The purpose of the noise removal routine is to reject any lines which are entirely above or below the symbol to be scanned. These lines are typically scans across notionally blank space, and if they are not removed the subsequent routines are likely to try very hard to interpret noise found within these areas as bars and/spaces. The noise removal routine also rejects bars which are either too big or too small. If the total number of rejected bars is greater than a pre-defined threshold, the whole scan is rejected as being too noisy. When the whole scan is not rejected, a good portion of it (the largest one with minimum noise) is provided as output 263. This is then passed on to the bar correlation routine 264.

The bar correlation routine 264 is based on the data structure known as LAG: see for example T Pavlidis, "*Algorithms for Graphics and Image Processing*", Computer Press 1982.

Figure 9:
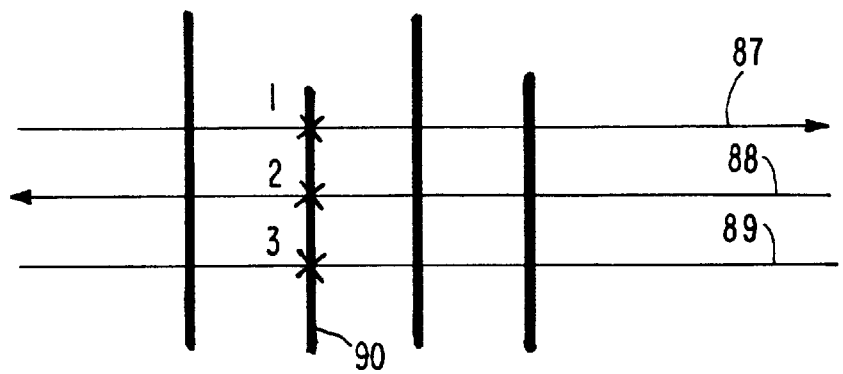
FIG. 9 illustrates how the Line Adjacency Graph (LAG) is built up.
Figure 10:
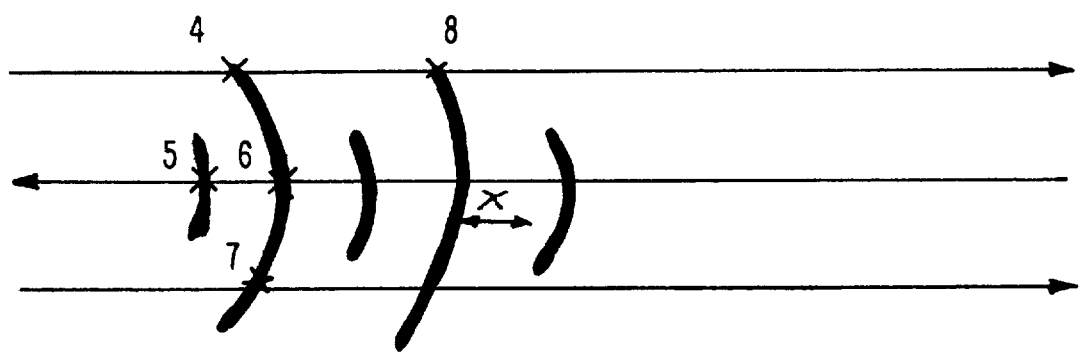
FIG. 10 illustrates how the LAG deals with curved bars.

The LAG method may best be understood with reference to FIGS. 9 and 10. The bar 90 in FIG. 9 is represented in the LAG by the individual points at which it is seen. A first scan line 87 crosses the bar 90 at 1, and this point is stored. The second scan line 88 crosses the bar at a second point 2, and this point is also stored. The third scan line 89 crosses the bar at a third point 3, and this point is identified as representing the lowest point so far of the bar 90. Point 2 is therefore dropped, and the bar is at this point then represented solely by the points 1 and 3. These represent, at a given instant, the uppermost detected part of the bar and the lowermost detected part of the bar. The uppermost and lowermost positions are moved and updated as further data comes in.

The system also retains the value x, in FIG. 10, defined as the smallest measured distance between the lines. This is a useful measure, in the event that the bars are curved, or appear to be curved, since the system is then capable of avoiding the mistake of linking points 4, 5 and 7 together as a single bar. The value of x is updated as data continues to come, so that on the first scan the value of x will be the distance between the points 4 and 8, whereas in the second scan line this will have been updated to the distance between the points 5 and 6.

The LAG data structure is quite insensitive to slips in adjacent lines, so long as the magnitude of the slip is limited. The diode 62 (FIG. 1) reduces the distortions in the raster to the point where a LAG data structure can operate.

The output from the bar correlation routine 264 of FIG. 6 is the completed LAG structure. This takes the form of a linked list, allocated from one of two static array structures. Each LAG element contains a starting point, an end point, and a forward pointer. The starting point and end points are preferably represented by row and column.

Once a full frame has been completed and coded, the LAG structure is passed onto the power-frame routines 240.

The first portion of the power-frame routines 240 is a segmentation routine 266. This routine looks at the entire frame, and acts to identify clearly the individual bars. This further recognition is required, since at this stage, some text may have inadvertently been stored in the LAG routine, typically text which has been printed immediately above or below the barcode symbol.

Every symbol contains a clock track that provides timing information for the symbology. The segmentation routines first segments the symbol in the y direction, in which the clock track is identified and all bars not intersecting this clock track are discarded. Then a segmentation in the x direction is performed. During this step left and right margins are found. Any gap smaller than the margin is filled with appropriate number of placeholders. These placeholders would eventually be classified with an "unknown" status (which is required by the Reed-Solomon error-correction routine).

During the segmentation process the parameters of the "clock" track are calculated. These include the clock's top and bottom locations, and its frequency. Later on these parameters are modified adaptively when we move away from the anchor point (see below). The clock's height itself is adapted only within a range, and its calculated value is saved for use during the classification process.

The PostBar segmentation functionality is accomplished by several functions. The main function for the segmentation code is int run_process(void)

which returns the number of bars if successful, and a negative error code if not.

The steps of the function are, briefly, as follows:

1. Estimation of the clock's y-dimension is done first. This is resolved from a complete scan over the LAG structure.
2. An index, namely bx[ ], is built for the LAG structure. This index allows the LAG linked list to be traversed in either direction.
3. An anchor point is found, with the help of some statistics collected when the LAG is built. The anchor is a two-bar neighborhood where the overlap of the two bars is believed to be the clock-track. This step produces three values: the anchor's index and the top and bottom location of the clock-track at the anchor point.
4. Segmentation in y direction is performed, from the anchor outwards and using the clock's y location information. The top and bottom of the anchor point defines a horizontal band across the LAG structure. All bars not intersecting this band are discarded. This step removes the leftover AGC (Automatic Gain Control) noise and isolated digitizer errors. The y location parameters (namely the top and bottom rows) are adapted when we move away to the left or right of the anchor point. The result of x-segmentation is in array by [ ]. Because this process only reduces the total number of Lags in the index, the array may only be smaller than box[ ]. Because the array is anchored in the middle, and the shrinkage may occur in either direction, two end indexes are employed.
5. The clock's frequency (in x-direction) is found near the anchor. Again, this process is done with the help of some statistical result gathered during the LAG creation.
6. Segmentation in x direction is performed, again from the anchor outwards and using the clock's frequency information. When there is a gap found in the postal code, the appropriate number of dummy elements (with index 0) are inserted as placeholders. The clock frequency is again adapted along the code. The resultant array is bz[ ]. Because this process increases the number of elements in the array, the size of bz[ ] is larger than those of bx[ ] and by[ ]. Furthermore, the maximum number of fill elements is limited. Again, because the array is anchored in the middle, the shrinkage may occur in either direction, therefore two end indexes are employed.

Because the indexes bx[ ] and by[ ] are used only during the segmentation process, they are shared between the two fields (each field is composed of scan lines in the same direction).

The output from the segmentation routines 266 are the individually-recognized bars 267. These are then passed on to a low-level bar classification routine 268.

The low-level bar classification routines 268 act to classify each of the detected bars as one of the four possible types, for example 202, 204, 206, 208 in FIG. 4. These bar types may respectively be known as "clock element", "full", "ascender" and "descender".

The classifier 268 first finds an anchor bar which contains the clock track. It then works from an anchor point outwards, comparing a bar's top and bottom with the current clock track location. When the bar has a top significantly higher than the clock, it is considered to have an ascender. The same logic is used with descenders. The clock track's location is updated as soon as a new piece of clock track is found.

The output from the low-level bar classification routines 268 are the individual bar states 269. These are passed to a high-level decoder 270.

The purpose of the high-level decoder 270 is to decode the high-level meaning of the barcode symbol that has been read. It will be understood that any suitable high-level decoder may be used, according to the high-level code that was used to encode the barcode symbol in the first place.

The output 254 from the high-level decoder is the information (for example numbers or text) which is represented by the barcode symbol that has been read.

It has previously been mentioned that the forward and reverse scans are processed separately until the bars of the code are isolated in each field (every frame is divided into a forward and a reverse field where the forward field contains the forward scan lines and the reverse field the reverse scan lines of the frame). The reason for this will now be discussed.

If neither the forward nor the reverse field can be decoded, the data from these two fields are merged and the output sent to the Low Level Bar Classifier 268. Why are these lines combined at all? Because the weakest point of the scanner is likely to be its limited vertical resolution. By merging the two fields, we regain part of the vertical resolution lost when we processed the two fields separately. Only when the two fields are similar can we merge them. However, since that the data from the two fields have different noise characteristics, and that the scan engine is not completely linear, the two fields are not always similar.

The merge function is int run_merge_lags(void)

which returns the number of bars if successful, and a negative error code is not. The main result is put in the array bz[ ] of the primary field.

Figure 7:
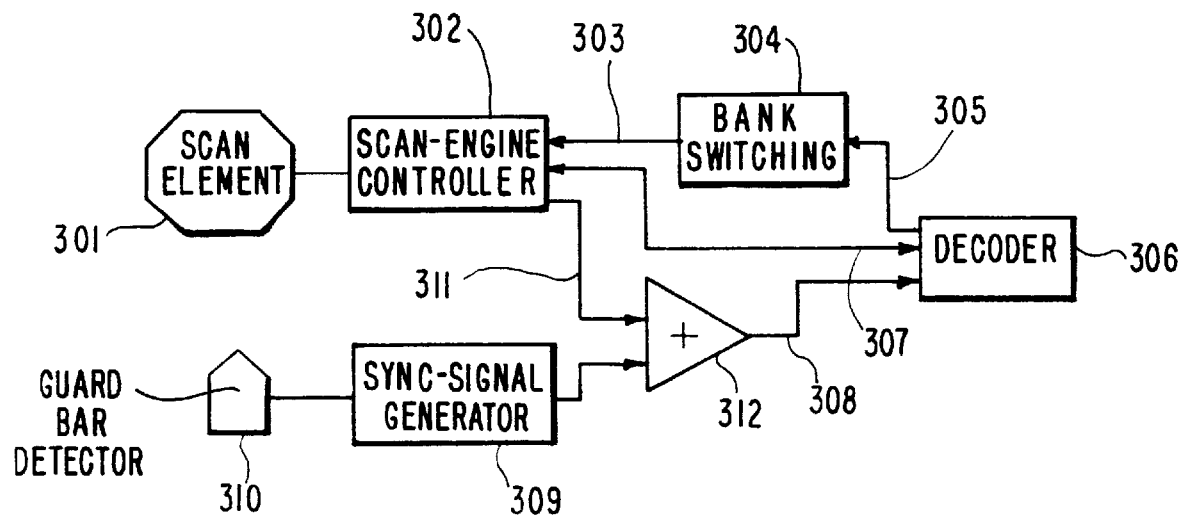
FIG. 7 is a schematic representation of the hardware required to support the software of FIG. 6.

FIG. 7 illustrates schematically some of the hardware which may be used to support the software shown in FIG. 6. This is more general than the hardware shown in FIG. 1, and in many circumstances the hardware of FIG. 1 may be used. However, in some circumstances there may be other ways of providing certain information, such as a synchronization signal, and FIG. 7 shows in more generic form how this may be achieved.

A scan element 301 is controlled by a scan engine controller 302, which produces a DBP signal to an amplifier 312. The other input to the amplifier 312 comes from a sync-signal generator 309 which itself is provided with a guard-bar photodiode 310 or other device for generating a synchronization signal. The output of the amplifier 312 is passed along a line 308 to a decoder 306. The decoder provides feedback along an Automatic Gain Control (AGC) line 305, to a bank switching mechanism 304. This itself provides feedback along a line 303 to the scan engine controller 302. Direct communication between the scan engine controller 302 and the decoder 306 is also possible along a further line 307.

Figure 8:
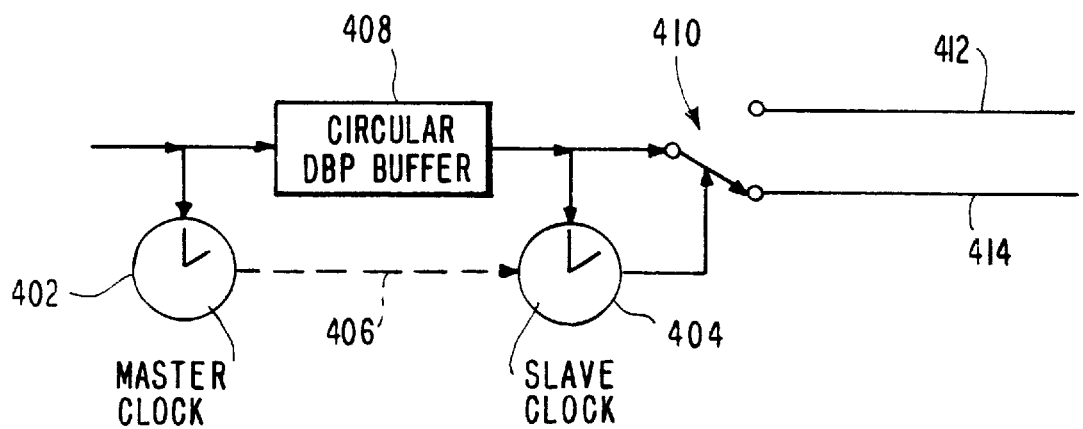
FIG. 8 illustrates dataflow using a master and slave clock.

FIG. 8 illustrates the use of two clocks, a master clock 402 and a slave clock 404. The slave clock 404 provides the primary synchronization signal, but if the DBP buffer 408 gets full, the slave clock 404 may lose synchronization. In that event, the slave clock is repeatedly re-synchronized as indicated by the arrow 406 by the master clock 402.

When dealing with postal barcodes we have to deal with 2-D image based data. This requires that the software has the exact frame information. Unfortunately the start-of-frame signal on the scan-engine is not accessible by the decoder software. Thus a clock is generated by the decoder on the start-of-scan interrupts. This clock is called the master clock 402 and contains a row number and a frame number.

The decode task actually sees the data slightly later than the data seen by the scan-engine. This delay is variable, depending on the data load. To provide frame information to the decode task, we also maintain the slave clock 404. This clock is only incremented when a scan line is loaded.

While we trust the interrupt driven master clock 402, we cannot trust the data driven slave clock 404 completely. For example, if the ASIC is reset, the slave clock would lose count. Therefore the two clocks need to be synchronized frequently. At any point when the slave clock passed the start-of-frame point of the master clock, the two clocks are synchronized.

The output from the DBP buffer 408 may be passed, via a user-selectable switch 410, to one of two lines 412,414. The two lines 412,414 may direct the flow of information to differing software modules, thereby allowing a single scanner to be used to decode a plurality of different barcode symbologies. For example, the line 412 may provide access to PostBar decoding, and the line 414 to non-PostBar decoding. It would of course be possible to have a multi-position switch, enabling three or more symbologies to be catered for. Also, the switch 410 may be automatic, in the sense that if the scanner does not decode correctly using a first assumed symbology, the switch will automatically pass the information on to a second decoder so that an attempt can be made to decode it according to a second symbology.

Where the scanner is set to decode several symbologies automatically, some mechanism needs to be provided to allow time for the individual decoders to operate. This is known as "mode switching" and in the preferred embodiment the switch 410 operates after each frame, so that alternate frames are passed along the line 412 and along the line 414. Information passed along the line 412 is sent to a PostBar decoder; information along the line 414 is send to a non-PostBar decoder, which may be chosen according to the application.

When the scanner commences its scan, it starts off in what is known as "postal code slab mode". If at any time a PDF matrix is found to have been initialized, the scan engine is switched into PDF mode. The detail of the switch is as follows: first, a y brake is applied, then after a preset time the raster gain is set to high level through the AGC line 305, and finally the y-raster is opened up to full size. Once this mode is entered the image processing functions are always by-passed.

It is possible for the PostBar decoder to run into difficulties. One of the possible scenarios is that if it takes too much time to decode but is still unable to do so, it not only gives no time back to the regular decoders, but also takes away time during the subsequent PostBar frame. When this happens, the next frame of data will not be complete, and the decoder may again fail after a long decode. To ensure that this type of "lock-up" does not happen, we keep an eye on the master clock during the decode, so when we see that the decoder may be taking too much time, we simply ignore the rest of the fields still to be decoded.

Many parameters are used to define the PostBar's size and features. These parameters are adapted when data are being processed and features found. We use a class of digital adaptive filters with the general formula $y=y+(x-y)/m$, where x is the input value, y is the parameter which is to be adapted towards x, and m is the "length" of the filter. Usually $m=2^n$, where n is an integer, so the division can be done in an efficient right shift operation. This type of filters are similar to the average filter over the last m input values, but is much easier to compute and costs less memory space.

The foregoing fully reveals the gist of the present invention so that others can, by applying current knowledge, readily adapt it for various applications without omitting features that, from the standpoint of prior art, fairly constitute essential characteristics of the generic or specific aspects of this invention. Such adaptations should be and are intended to be comprehended within the meaning and range of equivalence of the following claims.

What is claimed as new and desired to be protected by Letters Patent is set forth in the appended claims:

1. A two-dimensional scanner for electro-optically reading indicia extending along a longitudinal direction, and along a transverse direction substantially orthogonal to the longitudinal direction, the scanner comprising:
    a) a light source for producing a light beam;
    b) a scanning element for scanning the light beam along the longitudinal and the transverse directions over an indicium to be read; and
    c) a drive operatively connected to the scanning element, for producing a first electrical drive signal and a second electrical drive signal for causing the scanning element to scan the light beam along the longitudinal direction and the transverse direction, respectively, in a scan pattern in which a plurality of scan lines, each extending along the longitudinal direction, is spaced apart in mutual parallelism along the transverse direction, said second drive signal being a modified triangular waveform including harmonics, each having a magnitude and a phase, at least one of the magnitude and the phase of at least one of the harmonics being altered to cause the scan lines to be substantially evenly spaced apart along the transverse direction.

2. The scanner according to claim 1, wherein the light source is a laser.

3. The scanner according to claim 1, wherein the scanning element includes a pair of scan mirrors each mounted for repetitive oscillation about respective axes.

4. The scanner according to claim 1, wherein the first electrical drive signal is a sinusoidal waveform.

5. The scanner according to claim 1, wherein at least one of the magnitude and the phase of at least one of the odd harmonics is changed.

6. The scanner according to claim 5, wherein only the magnitude of said at least one odd harmonic is changed.

7. The scanner according to claim 6, wherein said at least one odd harmonic is a third harmonic.

8. The scanner according to claim 5, wherein only the phase of said at least one odd harmonic is changed.

9. The scanner according to claim 8, wherein said at least one odd harmonic is a third harmonic.

10. The scanner according to claim 1, wherein at least one of the magnitude and the phase of a plurality of the harmonics is changed.

11. The scanner according to claim 1, wherein the driver has a calibration input for selectively modifying said at least one of the magnitude and the phase of said at least one harmonic.

12. The scanner according to claim 1, wherein the drive has a drive frequency as considered along the transverse direction, wherein the scanning element has a scan frequency as considered along the transverse direction, and wherein the scan frequency is greater than the drive frequency and is not coincident with a harmonic of the drive frequency.

13. The scanner according to claim 12, wherein the drive frequency is on the order of 60 Hz.

14. The scanner according to claim 12, wherein the triangular waveform has third and fifth harmonics, and wherein the scan frequency is substantially different from the third and fifth harmonics.

15. The scanner according to claim 12, wherein the triangular waveform has no harmonics above a predetermined frequency which is greater than the drive frequency.

16. The scanner according to claim 15, wherein the predetermined frequency is on the order of 145 Hz.

17. The scanner according to claim 1, wherein the indicium is a plurality of bars spaced apart along the longitudinal direction by a plurality of spaces, the bars and the spaces having areas of different light reflectivity, and wherein the bars have different heights along the transverse direction.

18. A method of controlling a two-dimensional scanner for electro-optically reading indicia extending along a longitudinal direction, and along a transverse direction substantially orthogonal to the longitudinal direction, comprising the steps of:

a) producing a light beam;

b) scanning the light beam along the longitudinal and the transverse directions over an indicium to be read;

c) producing a first electrical drive signal and a second electrical drive signal for causing the scanning step to be performed by scanning the light beam along the longitudinal direction and the transverse direction, respectively, in a scan pattern in which a plurality of scan lines, each extending along the longitudinal direction, is spaced apart in mutual parallelism along the transverse direction, said second electrical drive signal being a triangular waveform including harmonics, each having a magnitude and a phase; and d) causing the scan lines to be substantially evenly spaced apart along the transverse direction by modifying at least one of the magnitude and the phase of at least one of the harmonics of the second drive signal.

19. The method according to claim 18, wherein the modifying step is performed by changing at least one of the magnitude and the phase of at least one of the odd harmonics.

20. The method according to claim 19, wherein the modifying step is performed by changing only the magnitude of said at least one odd harmonic.

21. The method according to claim 20, wherein said at least one odd harmonic is a third harmonic.

22. The method according to claim 19, wherein the modifying step is performed by changing only the phase of said at least one odd harmonic.

23. The method according to claim 22, wherein said at least one odd harmonic is a third harmonic.

24. The method according to claim 18, wherein the modifying step is performed by changing at least one of the magnitude and the phase of a plurality of the harmonics.

25. The method according to claim 18, wherein the modifying step is performed by experimentally determining a transfer function for the scanner, and changing the second drive signal in dependence upon the determined transfer function.

* * * * *